April 7, 1959
T. J. WOJCIAK ET AL
2,881,305
GAS SHIELDED ARC TORCH
Filed May 15, 1957
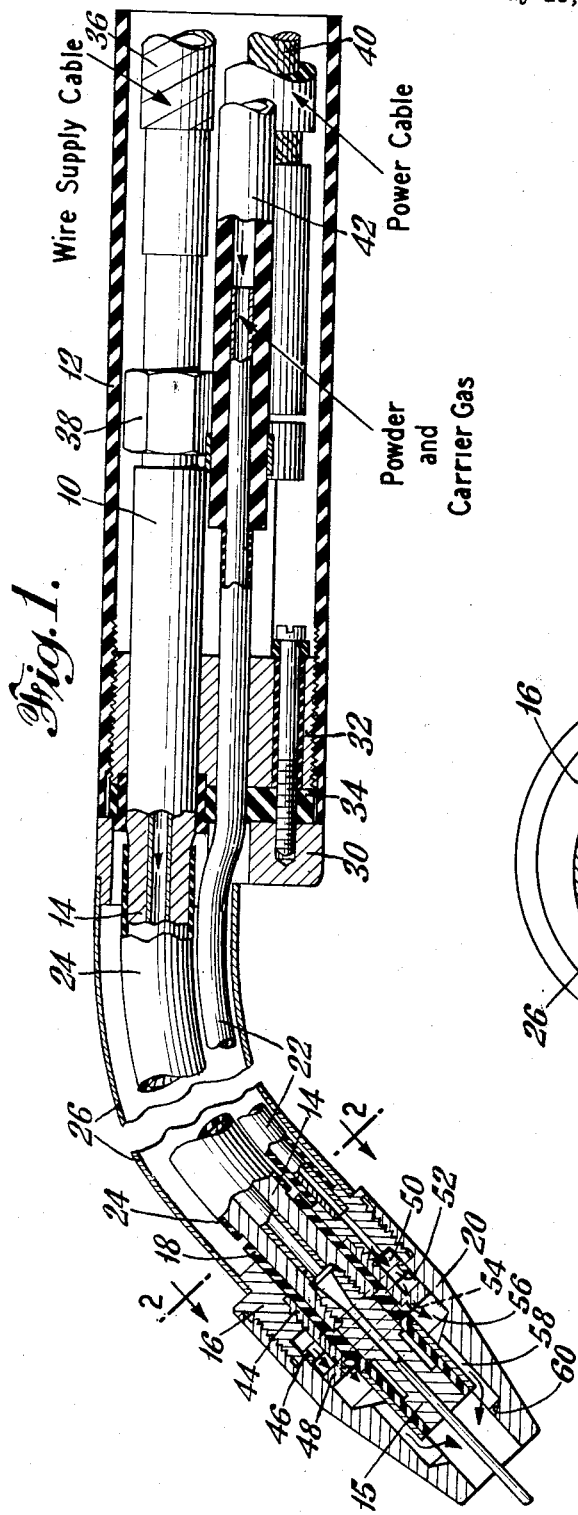
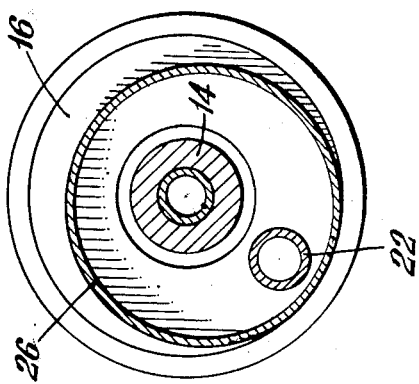
INVENTORS
THADDEUS J. WOJCIAK
PETER R. SCHAEFER
BY Richard S. Shreve Jr.
ATTORNEY

United States Patent Office 2,881,305
Patented Apr. 7, 1959

2,881,305

GAS SHIELDED ARC TORCH

Thaddeus J. Wojciak, Elizabeth, and Peter R. Schaefer, Newark, N.J., assignors to Union Carbide and Carbon Corporation, a corporation of New York Application May 15, 1957, Serial No. 659,251

9 Claims. (Cl. 219—130)

This invention relates to gas shielded arc torches, and more particularly to torches of this character in which adjuvant powder is suspended in the shielding gas stream and gas borne thereby.

Heretofore, the gas borne powder has passed through a stainless steel powder tube brazed into the torch body insert which insert carried the welding current to the torch guide tube. As a result the powder tube was in the magnetic field created by the welding current and powder passing through the tube built up on the walls of the powder tube and torch body. This, in effect, created a flux-starved welding condition upon starting and produced an excess of flux once the torch was shut off.

The main object of the present invention is to permit isolation of the gas entrained flux from the electrically energized parts and thus produce more uniform powder flow.

Torches of this character heretofore lacked flexibility and maneuverability for position welding and welding in confined locations and it is another object to provide a curved nozzle torch which is well balanced with all service lines entering at one location.

According to the present invention the torch comprises a handle, an electrode wire guide tube mounted in said handle and having a portion projecting therebeyond, a contactor tip carried by the front end of said projecting portion; an annular gas manifold surrounding said front end, a sleeve of insulating material surrounding said front end inside said manifold, a gas directing nozzle, said contactor tip and receiving gas from said manifold, and a gas supply tube extending from said handle to said manifold along and eccentric to said projecting wire guide tube portion, and a layer of insulating material between the outside of said guide tube and the outside of said eccentric gas supply tube. Preferably an outer tubular casing surrounds the projecting guide tube portion and said gas supply tube between said handle and said manifold, and the projecting portion, casing and gas tube are all curved to facilitate manipulation of the torch.

In the drawings:

Figure 1 is a longitudinal section through the torch according to the preferred embodiment of the present invention; and Figure 2 is a transverse section taken along the line 2—2 of Figure 1.

The torch shown in the drawings comprises a wire guide tube having a straight portion 10 mounted in a handle 12, and a curved portion 14 projecting from the front end of said handle. A contactor tip 15 is screwed into the outer end of the portion 14, and an annular gas manifold 16 surrounds the contact end of curved portion 14, being insulated therefrom by a sleeve 18. A gas directory nozzle 20 is screwed onto the manifold 16 to receive the gas therefrom.

A gas supply tube 22 is mounted in the handle and extends therefrom to the manifold 16 along and outside of said portion 14 and insulated therefrom by a sheath 24. The wire guide tube 14 and gas tube 22 are preferably both enclosed in a tubular casing 26 extending from the handle 12 to the manifold 16. Preferably the projection portion 14, gas tube 22 and casing 26 are all curved as shown to facilitate manipulation of the torch.

The front end of the casing 26 is silver soldered to the manifold 16 and the rear end of the casing is silver soldered to a head 30, to the inner side is bolted a plug 32 insulated therefrom by a disc 34. The handle 12 is formed by a sleeve of insulating material screwed onto the plug 32. The handle 12 may be unscrewed and slid along the service lines to facilitate coupling inside the handle.

A wire supply cable 36 enters the rear of the handle 12 and is connected in alignment with the guide tube 10 by a coupling 38. A current supply cable 40 enters the rear end of the handle and is suitably connected to the guide tube 10 inside the plug 32. A gas supply tube 42, preferably containing gas borne adjuvant powder with a magnetic component is connected inside the handle to the gas tube 22.

The manifold 16 has a large counterbore to receive a baffle having a central sleeve 44 and spaced radial flanges, 46 and 48 and form thereabove an annular chamber 50. Gas borne powder from the powder tube 22 enters the chamber 50 and is metered through holes 52 in the baffle flange 46 into the annular chamber between the baffle flanges. The powder is again metered through holes 54 in the lower baffle flanges, 48 which are angularly offset by about 45 degrees from the holes 52 in the upper baffle flange.

The powder then passes into the lower chamber 56 where it passes through flutes 58 in the inner wall of the nozzle. The bottoms of the flutes are inclined as at 60 with respect to the nozzle wall to deflect the powder inward toward the welding wire, while the carrier gas passes on out through the nozzle to shield the arc.

What is claimed is:

1. Gas shielded arc torch comprising a handle, an electrode wire guide tube mounted in said handle and having a portion projecting therebeyond, a contactor tip carried by the front end of said projecting portion, an annular gas manifold surrounding said front end of said projecting portion, a sleeve of insulating material surrounding said front end inside said manifold, a gas directing nozzle surrounding said contactor tip and receiving gas from said manifold, a gas supply tube extending from said handle to said manifold along and eccentric to said projecting wire guide tube portion, and a layer of insulating material between the outside of said guide tube and the outside of said eccentric gas supply tube.

2. Gas shielded arc torch as claimed in claim 1 in combination with a wire supply cable entering the rear end of said handle and connected in alignment with said guide tube, a current supply cable entering the rear end of said handle and connected to said guide tube, and a magnetic powder laden gas supply hose entering the rear end of said handle and connected in alignment with said gas supply tube.

3. Gas shielded arc torch as claimed in claim 1 in combination with an outer tubular casing of smaller diameter than said manifold and nozzle and eccentric thereto and surrounding said projecting guide tube portion and said gas supply tube between said handle and said manifold.

4. Gas shielded arc torch as claimed in claim 1 in combination with an outer tubular casing having said gas manifold secured to the outer end thereof and a head secured to the inner end thereof and an insulating tube detachably secured to said head to form said handle.

5. A gas shielded arc torch comprising a handle, an electrode wire guide tube mounted in said handle and having a curved portion projecting therebeyond, a contactor tip carried by the front end of said curved portion, an annular gas manifold surrounding the contact end of said curved portion, a sleeve of insulating material surrounding said front end inside said manifold, a gas directing nozzle surrounding said contactor tip and receiving gas from said manifold, a gas supply tube extending from said handle to said manifold along and outside of said curved wire guide tube portion, and a layer of insulating material between the outside of said guide tube and the outside of said eccentric gas supply tube.

6. Gas shielded arc torch comprising a handle, an electrode wire guide tube mounted in said handle and having a curved portion projecting therebeyond, a contactor tip carried by the front end of said curved portion, annular gas borne powder manifold surrounding the contactor tip end of said curved wire guide portion, a gas borne powder nozzle surrounding said contactor tip and receiving gas borne powder from said manifold, an outer tubular curved casing surrounding said curved guide tube portion between said handle and said manifold, a gas borne powder supply tube extending from said handle to said manifold inside said casing and outside of said wire guide tube, and a layer of insulating material between the outside of said guide tube and the outside of said eccentric gas supply tube.

7. Gas shielded metal arc welding torch comprising a torch body, an electrode wire guide tube mounted in said body, a gas directing nozzle concentric with said guide tube and extending therebelow to a discharge orifice, and a gas supply tube extending in side-by-side relation to said guide tube and insulated therefrom and opening into said nozzle at one side of said guide tube.

8. In a magnetic powder laden gas shielded arc torch, an electrode wire guide tube, a contactor tip carried by the front end of said guide tube, an annular gas manifold comprising metering baffles surrounding said contactor tip, and a sleeve of insulating material surrounding said front end inside said manifold and metering baffles.

9. Gas shielded metal arc welding torch comprising a torch body, an electrode wire guide tube mounted in said body, a gas directing nozzle concentric with said guide tube and extending therebelow to a discharge orifice, and a gas supply tube extending in side-by-side relation to said guide tube and insulated therefrom and opening into said nozzle at one side of said guide tube, said guide tube and said gas supply tube being curved between said body and said nozzle.

References Cited in the file of this patent
UNITED STATES PATENTS

| | | |
|---|---|---|
| 2,727,125 | Muller | Dec. 13, 1955 |
| 2,736,787 | Welch | Feb. 28, 1956 |
| 2,761,049 | McElrath et al. | Aug. 28, 1956 |
| 2,768,280 | Renaudie | Oct. 23, 1956 |
| 2,797,306 | Qualey | June 25, 1957 |